US012692394B2

(12) United States Patent
Kratzer

(10) Patent No.: US 12,692,394 B2
(45) Date of Patent: Jul. 28, 2026

(54) CORN WAX OXIDATES AND ESTERIFICATION PRODUCTS

(71) Applicant: Clariant International Ltd, Muttenz (CH)

(72) Inventor: Philipp Kratzer, Binswangen (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 413 days.

(21) Appl. No.: 18/280,707

(22) PCT Filed: Mar. 25, 2022

(86) PCT No.: PCT/EP2022/058023
§ 371 (c)(1),
(2) Date: Sep. 7, 2023

(87) PCT Pub. No.: WO2022/207517
PCT Pub. Date: Oct. 6, 2022

(65) Prior Publication Data
US 2024/0301208 A1 Sep. 12, 2024

(30) Foreign Application Priority Data
Mar. 30, 2021 (EP) ..................................... 21165757

(51) Int. Cl.
*C08L 91/06* (2006.01)
(52) U.S. Cl.
CPC .................................... *C08L 91/06* (2013.01)

(58) Field of Classification Search
CPC .......... C08L 91/06; C11C 3/006; C11C 1/025; C11C 1/08; C11C 3/04; C09D 11/12; C09D 191/06
See application file for complete search history.

(56) References Cited

U.S. PATENT DOCUMENTS

| | | | |
|---|---|---|---|
| 4,064,149 A | 12/1977 | Rieger | |
| 4,083,731 A | 4/1978 | Brotz | |
| 4,272,447 A | 6/1981 | Beharry | |
| 12,203,217 B2 * | 1/2025 | Wundlechner | .......... C08L 91/06 |
| 2014/0294965 A1 * | 10/2014 | Brown | ................... A61K 8/922 |
| | | | 424/539 |
| 2015/0247039 A1 * | 9/2015 | Herrlich | ................. C08L 91/06 |
| | | | 106/270 |

(Continued)

FOREIGN PATENT DOCUMENTS

| | | |
|---|---|---|
| DE | 2546791 | 1/1977 |
| DE | 10231886 | 2/2004 |

(Continued)

OTHER PUBLICATIONS

Kang et al., "Composition and Physiochemical Properties of Corn Wax", May 3, 2022.

(Continued)

*Primary Examiner* — Coris Fung
*Assistant Examiner* — Caroline D. Liott

(57) ABSTRACT
The invention relates to bright corn wax oxidates, to a process for their production and to their use for agricultural or forestry purposes, as an additive in plastic processing, in care products, in printing inks and/or in paints, and to saponified or estered corn wax oxidates produced by saponifying or estering the described corn wax oxidates.

9 Claims, 3 Drawing Sheets

(56)                    References Cited

U.S. PATENT DOCUMENTS

| | | |
|---|---|---|
| 2015/0284661 A1 | 10/2015 | Herrlich |
| 2023/0272231 A1 | 8/2023 | Wundlechner |
| 2024/0117186 A1 | 4/2024 | Kratzer |
| 2024/0117187 A1 | 4/2024 | Kratzer |
| 2024/0117188 A1 | 4/2024 | Kratzer |

FOREIGN PATENT DOCUMENTS

| | | |
|---|---|---|
| DE | 102013007638 | 11/2014 |
| DE | 102018116113 | 1/2020 |
| EP | 3102292 | 4/2018 |
| JP | 2015536356 A | 12/2015 |
| JP | 2016500054 | 1/2016 |
| WO | 2015117757 A1 | 8/2015 |

OTHER PUBLICATIONS

Lignite Utilization Technology (1 st Edition), Dear and Oset et al., pp. 359-361, Coal Industry Press, published Feb. 28, 1999.
Hénon G., Wax Analysis of Vegetable Oils Using Liquid Chromatography on a Double-Adsorbent Layer of Silica Gel and Silver Nitrate-Impregnated Silica Gel, Journal of the American Oil Chemists Society, 2001, 401-410, 78.
International Search Report and Written Opinion issued in App. No. PCT/EP2022/058023, mialing date Jul. 6, 2022, 15 pages.
Shriner R. L., The composition of corn wax, Journal of the American Chemical Society, 1927, 1290-1294, 49.

* cited by examiner

CORN WAX OXIDATES AND ESTERIFICATION PRODUCTS

The invention relates to light-colored corn wax oxidates having a low acid value, to a process for producing these oxidation products of corn wax, and to the use thereof for agricultural or forestry purposes, as an additive in plastics processing, in care products, in printing inks and/or in paints. Also provided are saponified or esterified corn wax oxidates respectively produced by the saponification or esterification of the corn wax oxidates of the invention.

The oxidation of fossil and nonfossil natural waxes with chromosulfuric acid has been known since the early 20th century and has been performed in industry using fossil montan waxes since 1927 in the "Gersthofen process" which is still being operated today. These chromic acid-based processes can be used to oxidize not only fossil montan wax but also renewable natural waxes, for example carnauba wax and candelilla wax. A process for the chromic acid oxidation of carnauba wax is described in DE-A 10231886. Carnauba waxes in their natural state (fatty grey, type 4; mid-yellow, prime yellow, and "Flor", types 3 to 1) and raw montan wax (black) are distinctly dark-colored. Oxidation with chromosulfuric acid leads to lighter-colored wax products.

However, oxidation of natural waxes with chromic acid results in cleavage of the wax esters and in-situ oxidation of the resulting wax alcohols to wax acids. The acid value is a measure of the content of free wax acids. Typical conversions in such oxidations are in the range of 50-90% based on the ester groups.

DE-A1 10 2013 007638 discloses a process for producing an acid wax having a defined acid value, in which a mixture of natural wax esters and alpha-olefins is oxidized with chromosulfuric acid. The natural wax esters are selected from the group consisting of rice husk wax, carnauba wax, sunflower wax, and sugar cane wax.

DE-A1 10 2018 116113 discloses a process for producing a natural wax oxidate by a two-stage oxidation process employing rice bran wax or sunflower wax as starting materials.

EP-A1 3 102 292 discloses the production of an oxidate from rice bran wax and montan wax by treatment with chromosulfuric acid.

U.S. Pat. No. 4,083,731 discloses the production of a montan and bark wax oxidate, wherein montan and bark wax is oxidized at 110° C. with a mixture of chromium trioxide and concentrated sulfuric acid.

The natural waxes bleached in this way have, in addition to the desired lightening, a higher saponification value and higher acid value than the unbleached waxes.

High acid values often have the advantageous effect that the natural wax oxidates can be more easily separated from by-products after oxidation, since the separation of the organic phase containing the wax oxidates from the aqueous phase containing chromium salts and other water-soluble reaction products is favored. However, at low acid values it has been observed that the phase separation often occurs very slowly or sometimes not at all. If there is no phase separation or phase separation is very slow, it is often not possible to reliably isolate and purify the natural wax oxidates without great effort.

Achieving high acid values that allow efficient phase separation involves larger amounts of chromosulfuric acid than are necessary for achieving low acid values and results in larger amounts of chromium salt waste. Avoiding large amounts of waste is desirable from both an economic and environmental viewpoint.

Typically, phase separations at low acid values are made additionally difficult when the natural waxes used have a high oil content, which means that pretreatment such as deoiling can often be necessary before oxidation. This can sometimes require large amounts of solvents, which is likewise economically and ecologically disadvantageous.

To obtain products having a low acid value from natural wax oxidates having a high acid value, the acid value of the wax oxidates can, after removal of the by-products, be lowered, for example by esterification of the acids present in the wax and/or wax oxidate with alcohols. This means that further synthesis steps, including after the oxidation, are required to achieve natural wax oxidates having low acid values, which likewise has economic and ecological drawbacks. In particular, when natural wax oxidates having a low acid value are required for particular uses, it would be advantageous to avoid the use of large amounts of chromosulfuric acid and the subsequent lowering of the acid value by esterification, as well as the use of large amounts of solvents prior to the oxidation.

An object of the present invention is to provide a process for producing a natural wax oxidate by chromosulfuric acid oxidation of a natural wax in which, after the oxidation, isolation of the natural wax oxidate is possible over a wide range of acid values.

It was surprisingly found that after the chromosulfuric acid oxidation of natural waxes it is possible to isolate and purify the natural wax oxidates despite low acid values, when a corn wax is used as the natural wax, even when the corn wax has a relatively high oil content.

The invention provides a process for producing a corn wax oxidate (O), comprising the steps of:

i) providing a corn wax (CW);

ii) providing a mixture (M) of chromium trioxide and sulfuric acid;

iii) performing the oxidation of the corn wax (CW) by reacting the corn wax (CW) with the mixture (M) to obtain a corn wax oxidate (O);

iv) ending the reaction and allowing the reaction mixture obtained in step iii) to stand until the organic phase has separated from the aqueous phase;

v) separating off the organic phase;

vi) optionally removing residues containing chromium compounds from the organic phase in order to obtain the corn wax oxidate (O) in purified form;

vii) optionally repeating the sequence of steps ii) to vi) using the corn wax oxidate (O), optionally in purified form, in place of the corn wax (CW).

This process allows light-colored natural wax oxidates based on corn wax—corn wax oxidates (O)—having an acid value in the range from about 10 to about 170 mg KOH/g to be obtained directly, without the need for further steps after isolation in order to adjust the acid value.

It has been found that when corn waxes (CW) are used as the starting material, the formation of a clear phase boundary between the organic phase and the aqueous phase in step iv) can be routinely observed in the process of the invention at an acid value as low as about 10 mg KOH/g. At acid values in the range from 20 to 50 mg KOH/g, a clear phase boundary is usually discernible within a period of less than 1 minute in step iv) of the process of the invention. At acid values above 50 mg KOH/g, a clear phase boundary is often already discernible within a period of less than 10 seconds in step iv) of the process of the invention. The times stated here were observed under conditions such as those stated in the examples. With much larger reaction batches the times can vary, but even then are significantly shorter than is the case with oxidates of other natural waxes produced under otherwise identical conditions.

At low to medium acid values the phase boundary is clearly discernible even with relatively high oil contents in the corn wax used. By contrast, in the case of rice bran wax oxidates under otherwise identical conditions, phase separation often occurs only at acid values of approx. 20 mg KOH/g and higher and only at a low oil content of <5% by weight, often only at oil contents of <2% by weight. In the case of montan waxes, phase separation often occurs only at acid values of approx. 50 mg KOH/g and higher.

The invention further provides a corn wax oxidate (O) that can be produced by reacting corn wax (CW) with a mixture of chromium trioxide and sulfuric acid.

It is possible to further modify the corn wax oxidates (O) of the invention, in order for example to further adjust their acid value after production of the corn wax oxidate (O) and/or to alter other properties, for example by esterification or saponification.

Esterification is normally carried out with alcohols, commonly with polyhydric alcohols, for example ethylene glycol, butylene glycol, glycerol, diglycerol, trimethylolpropane, ethylene glycol, pentaerythritol or sorbitol.

The invention therefore further provides an esterified corn wax oxidate (E) that can be produced by reacting the corn wax oxidate (O) of the invention with an alcohol, preferably a polyhydric alcohol, more preferably ethylene glycol, butylene glycol, glycerol or pentaerythritol.

Saponification is normally carried out with basic metal salts, commonly with alkali metal hydroxides and/or alkaline earth metal hydroxides. The invention therefore further provides a saponified corn wax oxidate (S) that can be produced by reacting the corn wax oxidate (O) of the invention or esterified corn wax oxidate (E) of the invention with a basic metal salt, preferably an alkali metal hydroxide and/or alkaline earth metal hydroxide, more preferably with $Ca(OH)_2$.

The invention therefore further provides for the use of the corn wax oxidate (O) of the invention, of the esterified corn wax oxidate (E) of the invention or of the saponified corn wax oxidate (S) of the invention for agricultural or forestry purposes, as an additive in plastics processing, in care products, in printing inks and/or in paints.

The invention also relates to the use of corn wax (CW) for producing a natural wax oxidate by oxidation with a mixture of chromium trioxide and sulfuric acid.

Corn wax is typically obtained from raw corn oil via a plurality of processing steps that include inter alia basic digestions of corn oil and also a plurality of purification steps by chemical, thermal and/or mechanical separation processes. One such process, in which waxes are removed as an unwanted by-product (approx. 60-90% by weight) from raw vegetable oils such as corn oil, is disclosed in U.S. Pat. No. 4,272,447.

According to information from the UN Food and Agriculture Organization (FAO), corn is one of the most widely produced cereals. In 2018, around 1147 million tons of corn were harvested worldwide.

In the processing of raw corn, more particularly the corn oil obtained therefrom, corn wax is obtained in large amounts as a by-product. Its high production figures and wide geographical distribution accordingly make corn wax an economically interesting natural wax.

Despite numerous analytical studies with inconsistent findings, the chemical composition of corn wax is yet to be fully clarified. What is however certain is that the wax mass is composed of wax esters. In "The composition of corn wax" R. L. Shriner (Journal of the American Chemical Society, 1927, 49, 1290-1294) states that corn wax consists at least in part of myricyl alcohol esters of $C_{22}$ and $C_{24}$ fatty acids. In "Wax Analysis of Vegetable Oils Using Liquid Chromatography on a Double-Adsorbent Layer of Silica Gel and Silver Nitrate-Impregnated Silica Gel" (Journal of the American Oil Chemists' Society 2001, 78, 401-410), G. Hénon states that corn wax from raw corn oil can have carbon chain lengths of 44 to 58 carbon atoms.

The corn wax esters consist mainly of monoesters of long-chain, saturated, unbranched monocarboxylic acids with long-chain, unbranched, aliphatic monoalcohols (also termed "genuine esters" hereinafter). The acid component of the corn wax esters is predominantly arachic, behenic, and lignoceric acids, with C20, C22, and C24 chain lengths, and the alcohol component of the corn wax esters has predominantly C24, C26, C28, C30, and C32 chain lengths. In addition, the wax may contain free fatty acids and further constituents such as squalene, phospholipids, and stearyl esters.

The content of wax esters in refined and deoiled corn wax is generally greater than 97% by weight. In non-deoiled corn wax, the content of wax esters, depending on the content of the corn oil, can be as little as 50% by weight. Further variable constituents of the corn wax that can be regarded as "trace constituents" are the otherwise unspecified "dark substances", squalene, and what is referred to as the "gum content". These components usually result in a product quality that varies in color and usability and is not readily reproducible.

A customary technique for lightening the brown corn wax is considered to be classic bleaching with hydrogen peroxide. Hydrogen peroxide-bleached corn waxes are yellowish and correspond largely to the starting waxes in their ester content and their acid value. Such types are predominantly supplied on the market as deoiled and refined corn waxes, but likewise exhibit variable product quality since the trace constituents remain in the product.

Corn wax oxidates having reduced acidity compared to the starting wax can be produced by means of the oxidation process described in DE 25 46 791 B through passage of air at elevated temperature. These accordingly have an acid value of less than 10 mg KOH/g, since the acid value of a raw corn wax is already below this value.

The process of the invention is able to produce light-colored corn wax oxidates (O) that have a consistent product quality compared to bleaching with hydrogen peroxide.

The corn wax oxidates (O) produced by the process of the invention usually have iodine color values measured according to DIN 6162 (2014) of less than 8 and yellowness indices measured according to ASTM E 313-20 of less than 50. However, it was found that through an appropriate choice of process parameters for the oxidation of corn wax it is possible to selectively achieve iodine color values measured according to DIN 6162 (2014) of less than 6, often less than 5, for example less than 2, and yellowness indices measured according to ASTM E 313-20 of less than 40, often less than 30, for example less than 15.

At the same time, needle penetration indices measured according to DIN 51579 (2010) of less than 10 $mm^{-1}$, often less than 6 $mm^{-1}$, for example less than 4 $mm^{-1}$, are achieved, which is particularly advantageous for uses in which hard waxes are required.

Figure 1:
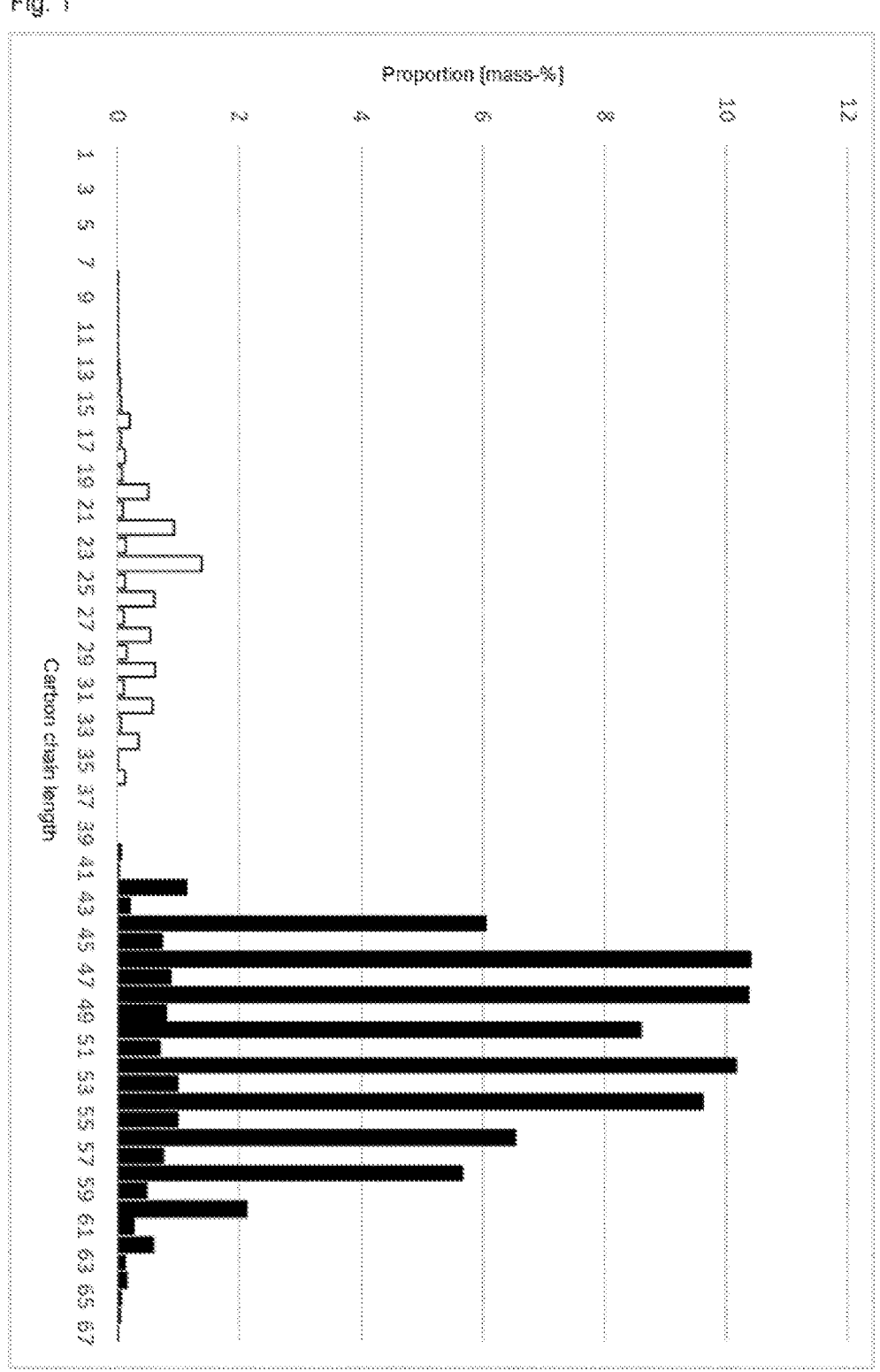
FIG. 1 shows the chain-length distribution of constituents of the corn wax oxidate of Example 2.

The process of the invention and the corn-wax-based products of the invention are described in more detail below.

The process of the invention for producing a corn wax oxidate (O) comprises the steps (or consists of the steps) of:

i) providing a corn wax (CW);

ii) providing a mixture (M) of chromium trioxide and sulfuric acid;

iii) performing the oxidation of the corn wax (CW) by reacting the corn wax (CW) with the mixture (M) to obtain a corn wax oxidate (O);

iv) ending the reaction and allowing the reaction mixture obtained in step iii) to stand until the organic phase has separated from the aqueous phase;

v) separating off the organic phase;

vi) optionally removing residues containing chromium compounds from the organic phase in order to obtain the corn wax oxidate (O) in purified form;

vii) optionally repeating the sequence of steps ii) to vi) one or more times using the corn wax oxidate (O), optionally in purified form, in place of the corn wax (CW).

The corn wax (CW) provided in step i) may be any corn wax.

When it is desirable for the corn wax oxidate (O) to have a low to medium acid value, for example 50 mg KOH/g or lower, the corn wax (CW) may contain a proportion of polyesters formed from polyhydric alcohols and aliphatic carboxylic acids having 8 to 20 carbon atoms of up to 25% by weight, preferably up to 15% by weight, more preferably up to 10% by weight, preferably up to 5% by weight, particularly preferably up to 3% by weight, based on the total weight of the corn wax (CW). As a rule, corn wax (CW) has a proportion of polyesters formed from polyhydric alcohols and aliphatic carboxylic acids having 8 to 20 carbon atoms of more than 0.1% by weight.

The desired proportion of polyesters formed from polyhydric alcohols and aliphatic carboxylic acids having 8 to 20 carbon atoms may in this case already be present in the corn wax in the raw state, but can also be adjusted through pretreatment of the corn wax. Preferably, the proportion is already present in the corn wax (CW) in the raw state. In this case, it is preferable that the corn wax (CW) is not pretreated.

If, on the other hand, proportions of polyesters formed from polyhydric alcohols and aliphatic carboxylic acids having 8 to 20 carbon atoms are significantly greater than 25% by weight, it may be advantageous to pretreat the corn wax (CW) before it is provided in step i). In this case, it is advantageous when the pretreatment does not include a saponification of the esters present in the corn wax (CW).

Instead, preference is given to an extraction of the polyesters formed from polyhydric alcohols and aliphatic carboxylic acids having 8 to 20 carbon atoms with one or more organic solvents, the extraction being performed until the desired proportion of polyesters formed from polyhydric alcohols and aliphatic carboxylic acids having 8 to 20 carbon atoms is attained. Any organic solvents that are able to dissolve oils and fats are suitable for this purpose, for example ethyl acetate or acetone, preferably ethyl acetate.

The polyesters formed from polyhydric alcohols and aliphatic carboxylic acids having 8 to 20 carbon atoms are preferably di- and triglycerides of aliphatic carboxylic acids having 8 to 20 carbon atoms, especially oils naturally present in corn, in particular corn oil.

The extraction with an organic solvent may accordingly be a deoiling. In this case, the proportion of polyesters formed from polyhydric alcohols and aliphatic carboxylic acids having 8 to 20 carbon atoms may also be referred to as the oil content of the corn wax.

It is preferable that the corn wax (CW), irrespective of the proportion of polyesters formed from polyhydric alcohols and aliphatic carboxylic acids having 8 to 20 carbon atoms in the raw state, is not pretreated by saponification at any time prior to the oxidation.

Preference is given to corn waxes (CW) comprising a mixture of linear esters having a number-average overall carbon chain length of from 45 to 55 atoms, preferably from 47 to 53 carbon atoms. Further preference is given to corn waxes (CW) comprising a mixture of linear esters, of which at least 30% by mass, preferably at least 40% by mass, more preferably at least 50% by mass, have an overall carbon chain length of not more than 52 carbon atoms, preferably from 40 to 52 carbon atoms.

In addition, the corn wax (CW) preferably has an acid value of less than 20 mg KOH/g, more preferably of less than 15 mg KOH/g, preferably of less than 10 mg KOH/g, particularly preferably of from 1 to 8 mg KOH/g. The corn wax (CW) additionally preferably has a saponification value of less than 150 mg KOH/g, more preferably of less than 120 mg KOH/g, preferably of from 30 to 100 mg KOH/g, particularly preferably of from 60 to 95 mg KOH/g.

The mixture (M) of chromium trioxide and sulfuric acid provided in step ii) may be any mixture, provided it is capable of oxidizing oxidizable constituents of corn wax. Such mixtures of chromium trioxide and sulfuric acid are also commonly referred to as chromosulfuric acid. The sulfuric acid is preferably concentrated sulfuric acid having a sulfuric acid content of at least 90% by weight, preferably at least 96% by weight, more preferably at least 99% by weight. This may optionally be fuming sulfuric acid, i.e. additionally contain sulfur trioxide. The concentration of chromium trioxide in the mixture (M) is preferably 50 to 200 g/l, more preferably 70 to 150 g/l, most preferably 80 to 120 g/l.

In step iii) of the process of the invention, the corn wax (CW) is oxidized by reacting the corn wax (CW) with the mixture (M) to obtain a corn wax oxidate (O). The reaction is preferably carried out with stirring and at a temperature of from 70 to 200° C., more preferably from 80 to 150° C., preferably from 90 to 140° C., particularly preferably from 105 to 130° C.

The weight ratio of total chromium trioxide used to corn wax (CW) used is preferably from 1:6 to 3:1, especially from 1:5 to 2:1, more preferably from 2:5 to 6:5. If the ratio is less than 1:6, the extent to which oxidation occurs is too small to bring about significant lightening of the corn wax. If the ratio is greater than 3:1, cleavage of the ester bonds occurs to a particularly high degree such that, depending on the other conditions, it can be difficult to conform to the desired acid values in the product. If step vii) of the process of the invention is carried out, the weight ratio of chromium trioxide used to corn wax (CW) used is preferably less than 6:5 each time step iii) is carried out.

This step iii) may optionally be divided into two or more steps. For example, step iii) may comprise the initial charging of the mixture (M) and subsequent addition of the corn wax (CW). Alternatively, step iii) may comprise the initial charging of the corn wax (CW) and subsequent addition of the mixture (M). In these cases, the respective second component (CW) or (M) may be added for example a little at a time, continuously or in a single portion, preferably a little at a time or continuously, more preferably a little at a time.

In embodiments in which the reaction in step iii) is carried out at a temperature of 70 to 200° C., the temperature of the corn wax (CW) and/or of the mixture (M) during the addition may optionally differ from the reaction temperature and be adjusted to the required value of from 70 to 200° C., more preferably 80 to 150° C., preferably from 90 to 140° C., particularly preferably from 105 to 130° C., only after the second component has been added.

For example, the temperature during the addition may have a value of from 60 to 150° C., preferably from 70 to 130° C., more preferably 80 to 110° C. Preferably, the corn wax (CW) is in molten form during the addition.

In one embodiment, the mixture (M) of chromium trioxide and sulfuric acid provided is initially charged and heated to a temperature of from 60 to 150° C., preferably from 70 to 130° C., more preferably 80 to 110° C., and the corn wax (CW) added in the solid state a little at a time. After the addition, the temperature is adjusted to 70 to 200° C., preferably from 80 to 150° C., preferably from 90 to 140° C., more preferably from 105 to 130° C., and the oxidation carried out.

In another embodiment, the mixture (M) of chromium trioxide and sulfuric acid provided is initially charged and heated to a temperature of from 60 to 130° C. and the corn wax (CW) added in the molten state a little at a time, preferably at a temperature of from 60 to 150° C., preferably from 70 to 130° C., more preferably 80 to 110° C. After the addition, the temperature is adjusted to 70 to 200° C., preferably from 80 to 150° C., preferably from 90 to 140° C., more preferably from 105 to 130° C., and the oxidation carried out.

In a further embodiment, the corn wax (CW) is initially charged and melted at a temperature of from 60 to 150° C., preferably from 70 to 130° C., more preferably 80 to 110° C., and the mixture (M) of chromium trioxide and sulfuric acid added a little at a time unheated. After the addition, the temperature is adjusted to 70 to 200° C., preferably from 80 to 150° C., preferably from 90 to 140° C., more preferably from 105 to 130° C., and the oxidation carried out.

In another embodiment, the corn wax (CW) is initially charged and melted at a temperature of from 60 to 150° C., preferably from 70 to 130° C., more preferably 80 to 110° C., and the mixture (M) of chromium trioxide and sulfuric acid added a little at a time hot, preferably at a temperature of from 60 to 150° C., preferably from 70 to 130° C., more preferably from 80 to 110° C. After the addition, the temperature is adjusted to 70 to 200° C., preferably from 80 to 150° C., preferably from 90 to 140° C., more preferably from 105 to 130° C., and the oxidation carried out.

In a further embodiment, corn wax (CW) and the mixture (M) of chromium trioxide and sulfuric acid are initially charged together at room temperature and heated gradually to a temperature of from 70 to 200° C., preferably from 80 to 150° C., preferably from 90 to 140° C., more preferably from 105 to 130° C., and the oxidation carried out at that temperature.

At least the oxidation at 70 to 200° C., 80 to 150° C., 90 to 140° C., or 105 to 130° C., preferably also the addition of the corn wax (CW) and/or of the mixture (M), takes place with stirring. The stirring can be effected here in any desired manner, for example with a mechanically driven stirrer, or a magnetically driven stirrer. The stirring is preferably effected with a mechanically driven stirrer, more preferably with a mechanically driven stirrer comprising a precision glass stirrer.

The stirrer speed in step iii) is preferably within a range from 100 to 500 rpm (revolutions per minute), more preferably from 120 to 300 rpm, most preferably from 170 to 250 rpm, since the mixing required for efficient oxidation may be absent at a stirrer speed below 100 rpm and at a stirrer speed above 500 rpm there is an increased risk of an emulsion forming that cannot be separated again.

The oxidation of the corn wax in step iii) preferably takes place over a period of at least 30 minutes, more preferably 45 minutes to 12 hours, even more preferably 1 to 8 hours, preferably from 2 to 5 hours, particularly preferably from 3 to 4.5 hours.

It is also advantageous when no oxidation promoters are added to the reaction mixture composed of corn wax (CW) and the mixture (M), since these can commonly result in cleavage of the ester bonds, and the acid value in the wax corn wax oxidate (O) can accordingly increase.

Preference is therefore given to using no oxidation promoters in the oxidation, especially no oxidation promoters such as, for example, emulsifiers (for example alkanesulfonates, fluorinated alkanesulfonates), surfactants, polymeric surfactants, nitrogen-containing cationic surfactants, phase-transfer catalysts, Fenton reagents, metal salts, hydrochloric acid or the like.

On attainment of the desired reaction time, in step iv) the reaction is ended and the reaction mixture allowed to stand until the organic phase separates from the aqueous phase. "Ending the reaction" is understood to mean that the stirring is stopped and the heating ended.

When this is done, the floating organic phase containing the corn wax oxidate (O) begins to separate from the sinking aqueous phase containing sulfuric acid and chromium compounds. Before being allowing to stand, the reaction mixture can optionally be transferred to an apparatus in which it is easier to separate off the organic phase after the organic phase has separated from the aqueous phase. An example of such an apparatus is a separating funnel. Other apparatuses for this purpose are known to the person skilled in the art and are employable here.

The time needed to attain the phase boundary depends on the acid value. Surprisingly, it was observed for the process of the invention that a clear phase boundary separating the organic phase from the aqueous phase was seen very shortly after "ending the reaction" in step iv). At acid values in the range of 20-50 mg KOH/g, a clear phase boundary was observed in a separation time of less than 1 minute. At acid values of >50 mg KOH/g this was the case within a few seconds.

The formation of a phase boundary after "ending the reaction" was observed even at very low acid values of about 10 mg KOH/g and is rather untypical for waxes oxidized by chromosulfuric acid. For instance, the describes synthesis procedure results in the observation of a phase boundary for rice waxes only at acid values of approx. 20 mg KOH/g and higher and for montan waxes only at acid values of approx. 50 mg KOH/g and higher under otherwise identical conditions. This is a clear advantage of corn wax oxidates (O)

over oxidates of other natural waxes, both from an economic and environmental viewpoint.

In step v), the organic phase containing the corn wax oxidate wax oxidate is separated off. This can be effected, for example, by means of a separating funnel. Alternatively, the floating organic phase can be siphoned off by suitable technical means.

It is likewise possible to pour off the organic phase over a rim of the vessel. Ways of separating organic phases from aqueous phases after a phase separation are known in principle to the person skilled in the art and are employable here.

In addition, it is optionally possible in step vi) to subject the separated organic phase containing the corn wax oxidate to further purification in order to remove residues containing chromium compounds from the organic phase and hence to obtain the corn wax oxidate in purified form.

The purification can be effected in any desired manner suitable for separating polar and/or water-soluble substances from organic substances. For example, the organic phase can be purified by chromatography or filtered through silica gel.

Preference is given to removing residues containing chromium compounds by washing the organic phase with an aqueous solution of oxalic acid and/or sulfuric acid. Alternatively, residues containing chromium compounds can preferably be removed by washing the organic phase with water. Alternatively, residues containing chromium compounds can preferably be removed by centrifuging the organic phase.

"Washing" is here in each case understood to mean the mixing of the organic phase with the respective washing medium, followed by phase separation according to steps iv) and v).

In a preferred embodiment, residues containing chromium compounds are removed by washing the organic phase one or more times with an aqueous solution of oxalic acid and sulfuric acid, followed by washing the organic phase one or more times with water.

In a further preferred embodiment, residues containing chromium compounds are removed by washing the organic phase one or more times with an aqueous solution of oxalic acid and sulfuric acid, followed by centrifuging the organic phase.

In a further preferred embodiment, residues containing chromium compounds are removed by washing the organic phase one or more times with water, followed by centrifuging the organic phase.

In a particularly preferred embodiment, residues containing chromium compounds are removed by washing the organic phase one or more times with an aqueous solution of oxalic acid and sulfuric acid, followed by washing the organic phase one or more times with water, followed by centrifuging the organic phase.

It is optionally possible in step vii) to repeat the sequence of steps ii) to vi) using the corn wax oxidate (O), optionally in purified form, in place of the corn wax (CW).

Preferably, the sequence of steps ii) to vi) is not repeated.

In a preferred embodiment, the process of the invention is a process for producing corn wax oxidates (O), comprising the steps of:
- (i) providing a corn wax (CW), preferably a deoiled corn wax (CW);
- (ii) providing a mixture (M) of chromium trioxide and sulfuric acid;
- (iii) performing the oxidation of the corn wax (CW) by reacting the corn wax (CW) with the mixture (M) while stirring and at a temperature of from 70 to 200° C., preferably from 80 to 150° C., preferably from 90 to 140° C., more preferably from 105 to 130° C., to obtain a corn wax oxidate (O);
- (iv) ending the reaction and allowing the reaction mixture obtained in step iii) to stand until the organic phase has separated from the aqueous phase;
- (v) separating off the organic phase;
- (vi) optionally removing residues containing chromium compounds from the organic phase in order to obtain the corn wax oxidate (O) in purified form;
- (vii) optionally repeating the sequence of steps ii) to vi) using the corn wax oxidate (O), optionally in purified form, in place of the corn wax (CW), wherein the oxidation in step iii) takes place over a period of at least 30 minutes, preferably 45 minutes to 12 hours, more preferably 1 to 8 hours, preferably from 2 to 5 hours, particularly preferably from 3 to 4.5 hours.

In this embodiment it is possible to particularly selectively achieve iodine color values measured according to DIN 6162 (2014) of less than 6, often less than 5, for example less than 2, and/or yellowness indices measured according to ASTM E 313-20 of less than 40, often less than 30, for example less than 15.

The invention further provides a corn wax oxidate (O) obtainable by reacting corn wax (CW) with a mixture (M) of chromium trioxide and sulfuric acid. The corn wax oxidate (O) preferably has an acid value greater than that of the corn wax (CW) used.

Preferably, the corn wax oxidate (O) of the invention has an acid value measured according to ISO 2114 (2002) of from about 10 to about 170 mg KOH/g, more preferably from 10 to 140 mg KOH/g, more preferably from 11 to 130 mg KOH/g, even more preferably from 15 to 110 mg KOH/g. In one embodiment, the corn wax oxidate (O) of the invention has an acid value of from about 10 to less than 20 mg KOH/g.

In an alternative embodiment, the corn wax oxidate (O) of the invention has an acid value of from about 20 to about 50 mg KOH/g. In a further alternative embodiment, the corn wax oxidate (O) of the invention has an acid value measured according to ISO 2114 (2002) of from above 50 to about 170 mg KOH/g. In a further embodiment, the corn wax oxidate (O) of the invention has an acid value of less than 140 mg KOH/g, preferably less than 110 mg KOH/g, more preferably less than 60 mg KOH/g, particularly preferably less than 40 mg KOH/g, especially preferably less than 20 mg KOH/g.

Depending on the degree of reaction of the esters, the corn wax oxidate of the invention contains genuine esters (C42-C60). "Genuine esters" are here understood as meaning the residual proportions of the wax esters originally contained in the raw wax that are not covered by the reaction.

The invention further provides a corn wax oxidate (O) having an acid value measured according to ISO 2114 (2002) of from about 10 to about 170 mg KOH/g, the ratio of the proportion by weight of genuine wax esters of 46 carbon atoms to the proportion by weight of genuine wax esters of 52 carbon atoms being greater than 1. This corn wax oxidate (O) can be produced by a process as claimed in claim 1.

Preferably, the corn wax oxidate (O) of the invention is characterized in that the acid value of the corn wax oxidate (O) is greater than that of the corn wax (CW).

In addition, the corn wax oxidate (O) of the invention, especially when it has been produced by a process as claimed in claim 1, preferably has an iodine color value of less than 6, more preferably of less than 5, even more preferably less than 3, preferably less than 2, especially preferably less than 1.5 (measured according to DIN 6162 (2014)). Alternatively, the corn wax oxidate (O) of the invention preferably has a yellowness index of less than 50, more preferably of less than 30, even more preferably of less than 20, preferably less than 15, especially preferably less than 10 (measured according to ASTM E 313-20).

In addition, the corn wax oxidate (O) of the invention preferably has a proportion of polyesters formed from polyhydric alcohols and aliphatic carboxylic acids having 8 to 20 carbon atoms of less than 5% by weight, more preferably less than 3% by weight, most preferably less than 1% by weight, based on the total weight of the corn wax oxidate (O).

In one embodiment, the corn wax oxidate (O) contains a) 3% to 40% by weight, based on the total weight of the corn wax oxidate (O), of free aliphatic carboxylic acids having 8 to 36 carbon atoms;

b) 0% to 10% by weight, based on the total weight of the corn wax oxidate (O), of free aliphatic alcohols having 24 to 36 carbon atoms;

c) 0% to 5% by weight, based on the total weight of the corn wax oxidate (O), of free aliphatic dicarboxylic acids having 10 to 30 carbon atoms;

d) 30% to 97% by weight, based on the total weight of the corn wax oxidate (O), of genuine esters having 40 to 66 carbon atoms; and e) 0% to 30% by weight, based on the total weight of the corn wax oxidate (O) of further natural constituents present in corn wax, where the sum total of a), b), c), d), and e) is 100% by weight based on the total weight of the corn wax oxidate (O).

In a preferred embodiment, the corn wax oxidate (O) contains a) 3% to 15% by weight, based on the total weight of the corn wax oxidate (O), of free aliphatic carboxylic acids having 8 to 36 carbon atoms;

b) 0% to 7% by weight, based on the total weight of the corn wax oxidate (O), of free aliphatic alcohols having 24 to 36 carbon atoms;

c) 0% to 4% by weight, based on the total weight of the corn wax oxidate (O), of free aliphatic dicarboxylic acids having 10 to 30 carbon atoms;

d) 65% to 97% by weight, based on the total weight of the corn wax oxidate (O), of genuine esters having 40 to 66 carbon atoms; and e) 0% to 15% by weight, based on the total weight of the corn wax oxidate (O) of further natural constituents present in corn wax, where the sum total of a), b), c), d), and e) is 100% by weight based on the total weight of the corn wax oxidate (O).

In a preferred embodiment, the corn wax oxidate (O) contains a) 3% to 10% by weight, based on the total weight of the corn wax oxidate (O), of free aliphatic carboxylic acids having 8 to 36 carbon atoms;

b) 0% to 5% by weight, based on the total weight of the corn wax oxidate (O), of free aliphatic alcohols having 24 to 36 carbon atoms;

c) 0% to 3% by weight, based on the total weight of the corn wax oxidate (O), of free aliphatic dicarboxylic acids having 10 to 30 carbon atoms;

d) 75% to 97% by weight, based on the total weight of the corn wax oxidate (O), of genuine esters having 40 to 66 carbon atoms; and e) 0% to 15% by weight, based on the total weight of the corn wax oxidate (O) of further natural constituents present in corn wax, where the sum total of a), b), c), d), and e) is 100% by weight based on the total weight of the corn wax oxidate (O).

The invention likewise provides a corn wax oxidate (O) having an acid value of less than 50 mg KOH/g and a proportion of polyesters formed from polyhydric alcohols and aliphatic carboxylic acids having 8 to 20 carbon atoms of less than 5% by weight, based on the total weight of the corn wax oxidate (O), containing:

a) 3% to 25% by weight, based on the total weight of the corn wax oxidate (O), of free aliphatic carboxylic acids having 8 to 36 carbon atoms;

b) 0% to 10% by weight, based on the total weight of the corn wax oxidate (O), of free aliphatic alcohols having 24 to 36 carbon atoms;

c) 0% to 5% by weight, based on the total weight of the corn wax oxidate (O), of free aliphatic dicarboxylic acids having 10 to 30 carbon atoms;

d) 50% to 97% by weight, based on the total weight of the corn wax oxidate (O), of genuine esters having 40 to 66 carbon atoms; and e) 0% to 15% by weight, based on the total weight of the corn wax oxidate (O) of further natural constituents present in corn wax, where the sum total of a), b), c), d), and e) is 100% by weight based on the total weight of the corn wax oxidate (O).

Preferably, lignoceric acid is here present in the corn wax oxidate (O) to an extent of not more than 5% by weight, more preferably not more than 3% by weight, based on the total weight of the corn wax oxidate (O).

The proportions by weight and chain length distributions can be measured for example by gas chromatography.

In addition, the corn wax oxidates of the invention typically have a dropping point measured according to ISO 2176 (1997) of between 70° C. and 90° C., preferably between 75° C. and 80° C.

The corn wax oxidates of the invention preferably have a needle penetration index (NPI) measured according to DIN 51579 (2010) of less than 10 $mm^{-1}$, preferably less than 6 $mm^{-1}$, more preferably less than 4 $mm^{-1}$, most preferably less than 3 $mm^{-1}$.

The oxidation of the corn wax preferably increases the saponification value measured according to DIN ISO 3681 (2019) by not more than 70%, preferably by not more than 40%, more preferably by not more than 30%. The increase in the saponification value can be explained mechanistically by the cleavage of the wax esters and the subsequent oxidation of the wax alcohols to acids. In addition, some of the unsaturated carbon-carbon bonds are cleaved by the oxidizing agent and likewise oxidized to acids.

Thus, the saponification value is also a measure of the oxidation that has actually taken place, as opposed to saponification in which the saponification value does not change, as is well known, and as opposed to other bleaching methods in which there is merely lightening of the product. For example, the effect of the bleaching of corn wax with hydrogen peroxide is not for the purposes of the invention a chemical modification of the wax, since it merely removes discoloring impurities and secondary constituents without altering the actual wax structure.

The corn wax oxidate (O) of the invention typically features particularly good thermal stability, measured according to DIN 51006 (2005), with a loss of mass up to the attainment of a temperature of 300° C. (heating rate: 5° C./min) of less than 50%, preferably less than 20%, more preferably less than 10%.

The invention further provides an esterified corn wax oxidate (E) produced by esterification or reaction of the corn wax oxidate (O) described above with an alcohol. Preferred alcohols are polyhydric alcohols, for example ethylene glycol, butylene glycol, glycerol, diglycerol, trimethylolpropane, pentaerythritol or sorbitol, etc. In the esterification, a weight ratio of alcohol to corn wax oxidate (O) of from 1:100 to 1:5, more preferably from 1:50 to 1:10, most preferably 1:20 to 1:12, is chosen.

The esterified products preferably feature, alongside the renewable raw material basis, particularly good thermal stability, measured according to DIN 51006 (2005), with a loss of mass up to the attainment of a temperature of 300° C. (heating rate: 5° C./min) of less than 15%, preferably less than 10%. Preferably, the esterified products have an acid value of less than 40 mg KOH/g, more preferably less than 30 mg KOH/g, most preferably of less than 20 mg KOH/g. The invention likewise provides for the use of the corn wax oxidates (O) of the invention or of the saponified corn wax oxidates (S) of the invention or of the esterified corn wax oxidates (E) of the invention for agricultural or forestry purposes, as an additive in plastics processing, in care products, in printing inks and/or in paints.

The invention further provides a saponified corn wax oxidate (S) produced by saponifying the above-described corn wax oxidate (O) or the above-described esterified corn wax oxidate (E) with a basic metal salt selected from the group consisting of metal hydroxides (for example NaOH, KOH, $Ca(OH)_2$, $Zn(OH)_2$, etc.), metal oxides (for example CaO, etc.), metal carbonates (for example $Na_2CO_3$, $CaCO_3$, etc.) or with aqueous alkalis (for example NaOH, KOH, etc.). Preference is given to alkali metal hydroxides and/or alkaline earth metal hydroxides, especially NaOH, KOH and/or $Ca(OH)_2$. Very particular preference is given to $Ca(OH)_2$.

In the saponification, a weight ratio of basic metal salt to corn wax oxidate (O) of from 1:100 to 1:5, more preferably from 1:50 to 1:10, is chosen.

Corresponding production methods can be found for example in DE4019167 or in EP1010728. The saponified products preferably feature, alongside the renewable raw material basis, particularly good thermal stability, measured according to DIN 51006 (2005), with a loss of mass up to the attainment of a temperature of 300° C. (heating rate: 5° C./min) of less than 10%, preferably less than 5%. Preferably, the saponified products have an acid value of less than 40 mg KOH/g, more preferably of less than 25 mg KOH/g, most preferably of less than 15 mg KOH/g.

The invention also provides for the use of corn wax (CW) for producing a natural wax oxidate by oxidation with a mixture (M) of chromium trioxide and sulfuric acid.

Figure 2:
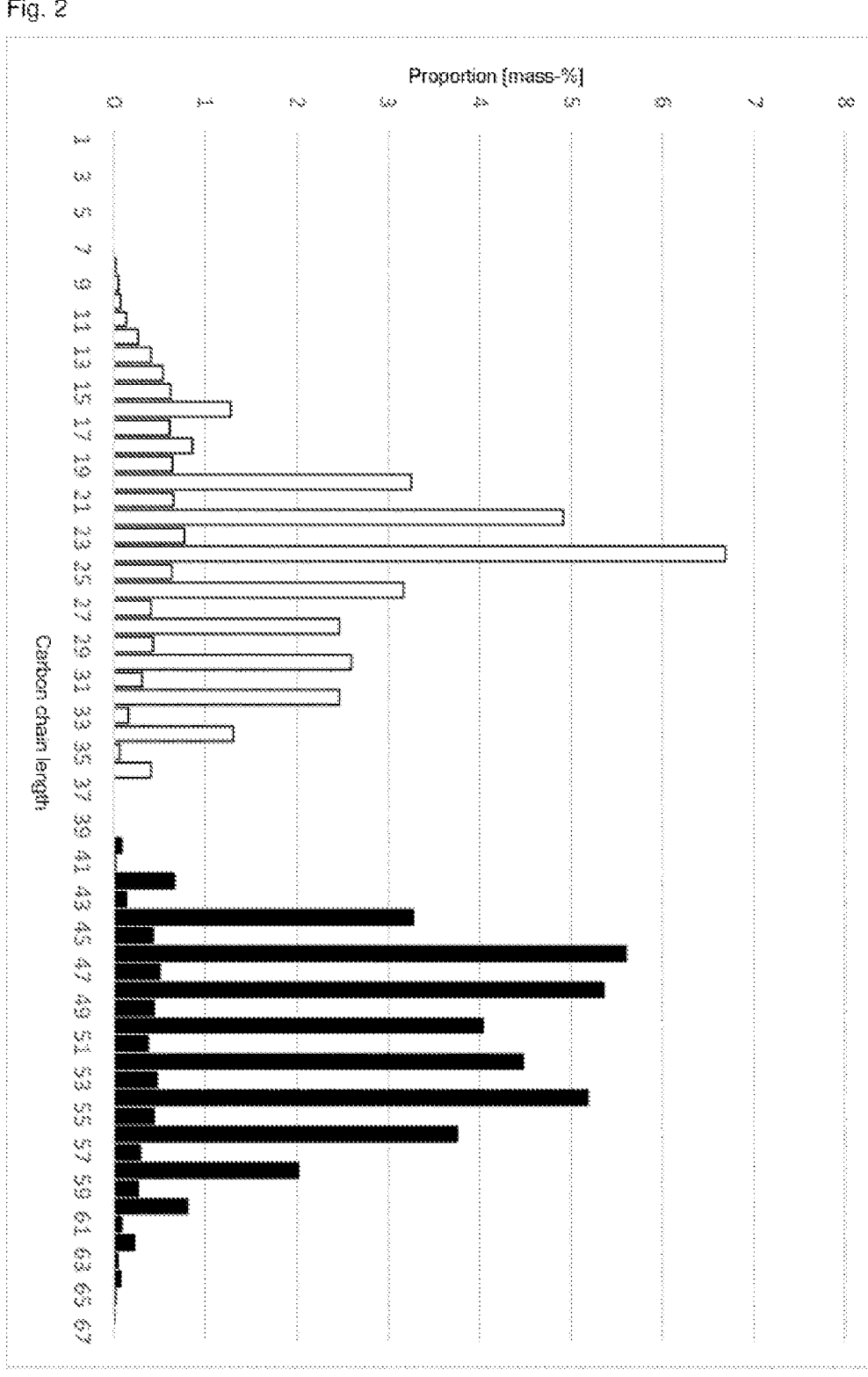
FIG. 2 shows the chain-length distribution of constituents of the corn wax oxidate of Example 7, wherein free acids are represented by unfilled bars and esters are represented by filled bars.
Figure 3:
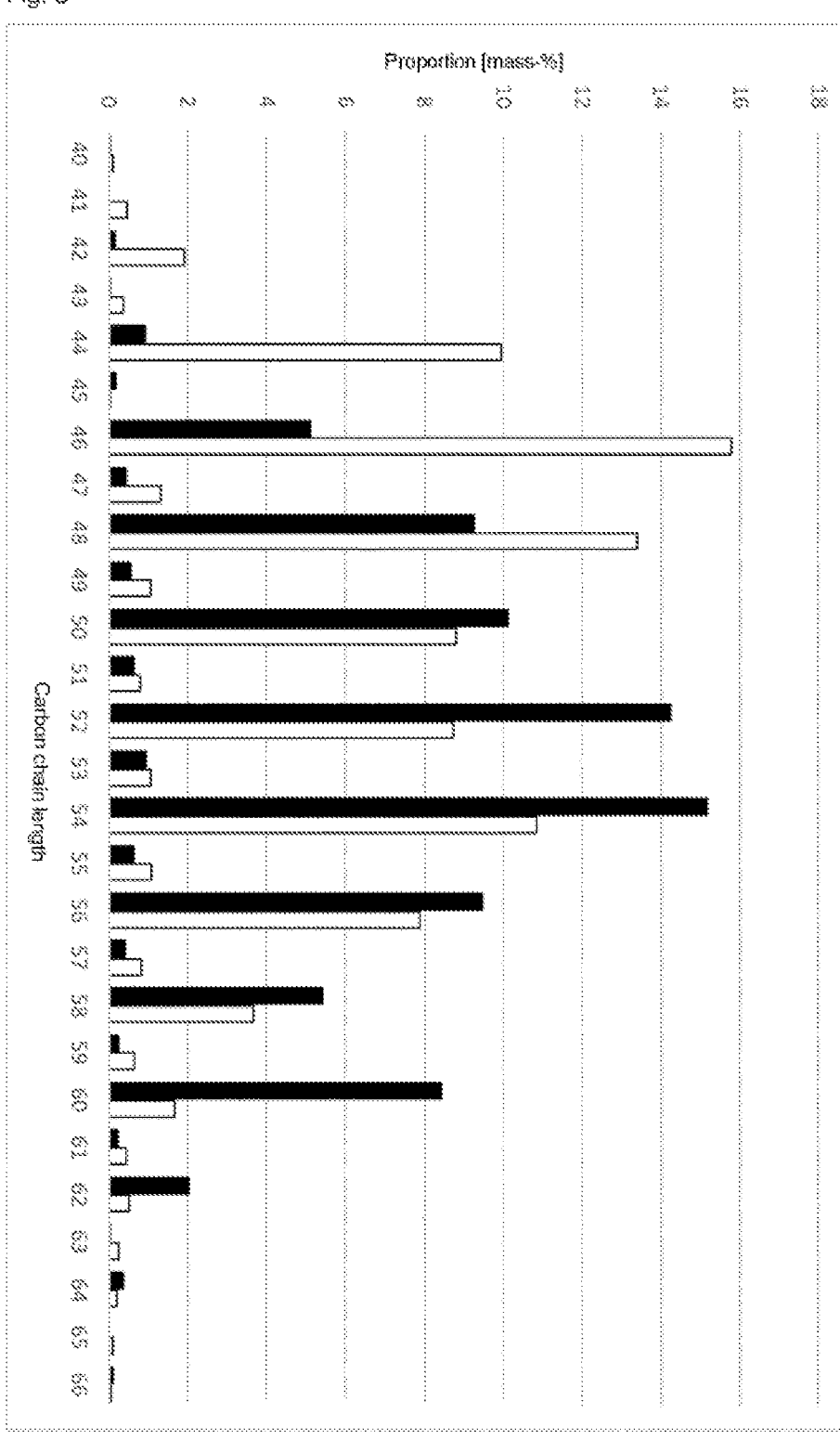
FIG. 3 shows the chain-length distribution of esters in a corn wax and, for comparison, the chain-length distribution of esters in a rice bran wax, wherein the corn wax is represented by unfilled bars and the rice bran wax is represented by filled bars.

The invention is elucidated in more detail by the examples, FIGS. 1-3, and claims that follow.

Substance Characterization

The standard methods detailed in Table 1, which are also employed in the characterization of montan waxes and montan wax derivatives, serve for determination of the characteristic values of the corn waxes, corn wax oxidates, and further corn wax derivatives.

TABLE 1

| | Method |
|---|---|
| Acid value (AV) [mg KOH/g] | ISO 2114 (2002) |
| Saponification value (SV) [mg KOH/g] | ISO 3681 (2019) |
| Dropping point (DP) [° C.] | ISO 2176 (1997) |
| Melting point (MP) [° C.] | DIN EN ISO 11357-1 (2017) |
| Enthalpy of fusion (EF) [J/g] | DIN EN ISO 11357-1 (2017) |
| Oil content (OC) [% by weight] | AOCS Ja 4-46 (2017) |
| Thermogravimetric analysis (TGA), % by weight from 25 to 300° C. at 5 K/min, then 30 min at 300° C. Measurement of loss of mass on attainment of 300° C. and after 30 min at 300° C. | DIN 51006 (2005) |
| Iodine color value (ICV) | DIN 6162 (2014) |
| Yellowness index (YI) | ASTM E 313-20 |
| Ca content [% by weight] (CaC) | DGF M-IV 4 (1963) |
| Needle penetration index [mm$^{-1}$] (NPI) | DIN 51579 (2010) |

The chain length distributions of the constituents of the corn wax oxidates were determined by gas chromatography. The comparative substances used were wax acids and wax alcohols having carbon chain lengths of between C6 and C36.

C44 to C58 wax esters were prepared through combination of the model substances. In order to identify the peaks in the gas chromatograms of the corn waxes, a defined amount of the individual components in each case was added to a wax sample and a distinct increase in the area of the corresponding peak observed. The measurement conditions are shown in Table 2.

TABLE 2

| Column | Agilent Technologies HP-1 (DB-1) length 15 m i.d. 0.25 mm film 0.10 μm |
|---|---|
| Detector | 310° C. FID |
| Injector | 300° C. split 1:100 |
| Carrier gas | Helium |
| Solvent | Toluene |
| Concentration | 30 mg/ml |
| Injected volume | 1 μl |
| Temperature program | 40 to 320° C. at 5 K/min; hold at 320° C. for 50 min |

The raw materials used were two different corn waxes (CW 1-2) as comparative examples and two rice bran waxes (RBW 1-2), a sugar cane wax (SCW), and a carnauba wax (CarW) as comparative examples, in each case in the raw state. The properties of the corn waxes and comparative waxes in the raw state are shown in Table 3.

The rice bran waxes selected were ones having acid values, saponification values, and oil contents between those of the corn waxes used. The acid values of sugar cane wax and carnauba wax are naturally higher than the acid value of corn wax or rice bran wax.

TABLE 3

| (methods, abbreviations, and units in Table 1) | | | | | | | |
|---|---|---|---|---|---|---|---|
| Natural wax | AV | SV | DP | MP | EF | OC | TGA |
| CW 1 | 2.0 | 80.1 | 78 | 81 | −219 | 2.4 | 2.3/17.9 |
| CW 2 | 7.1 | 90.0 | 77 | 80 | −203 | 9.7 | 5.4/20.0 |
| RBW 1* | 6.0 | 88.0 | 74 | 78 | −178 | 8.5 | 3.5/14.0 |
| RBW 2* | 4.0 | 84.0 | 76 | 80 | −184 | 4.3 | 3.4/16.6 |

TABLE 3-continued

| (methods, abbreviations, and units in Table 1) | | | | | | | |
|---|---|---|---|---|---|---|---|
| Natural wax | AV | SV | DP | MP | EF | OC | TGA |
| SCW* | 8.7 | 63.3 | 75 | 71 | −144 | — | 9.9/23.1 |
| CarW* | 11.1 | 89.2 | 84.8 | 85 | −186 | — | 4.2/15.7 |

*Comparative example

EXAMPLES 1 TO 8 AND COMPARATIVE EXAMPLES 9 TO 15

A 3 L reaction vessel equipped with stirrer, temperature sensor, dropping funnel, and reflux condenser was initially charged with the amount of chromium trioxide in 96% sulfuric acid (concentration: 100 g $CrO_3$/l) specified in Table 4, and heated to 100° C. Molten (90° C.) natural wax in the raw state was then added a little at a time. The temperature of the reaction mixture was adjusted to 110° C., and the reaction mixture stirred with a precision glass stirrer at approx. 200 rpm for 4 h. The heating and stirring were switched off. As soon as the phases had separated, the aqueous phase was separated off. This operation is performed twice in examples 3 and 7, and three times in example 8. In examples 9, 10, 12, 14, and 15 (comparative examples), no phase separation occurred. The properties of the natural wax oxidates accordingly could not be investigated.

The organic phase was freed of chromium residues by washing with an aqueous solution of oxalic acid and sulfuric acid and then by washing with water, drained into warm centrifuge tubes, and centrifuged. The conditions of the oxidations and properties of the corn wax oxidates are reported in Table 4.

The measured chain length distribution is shown in FIG. 1 for example 2 and in FIG. 2 for example 7, in which the free acids are illustrated by unfilled bars and esters by filled ones.

The chain-length distribution of the esters in the corn wax used (unfilled bars) is shown in FIG. 3. The average chain length was determined as 50 carbon atoms.

By way of comparison, FIG. 3 additionally shows the chain-length distribution of a rice bran wax having a number-average chain length of 53 carbon atoms (filled bars). Plotted on the abscissa in each case is the carbon chain length and on the ordinate the proportion of the respective carbon chain length in the total chain-length distribution in % by mass, in each case determined from the peak areas in the gas chromatogram.

It can be seen from examples 1 to 8 that the corn wax oxidates have a light intrinsic color, with an iodine color value of less than 5 and a yellowness index of less than 30. At the same time, acid values across a wide range have been achieved, ranging from a very low value of 11 mg KOH/g to a high value of 128 mg KOH/g.

In contrast, in the comparative examples 9, 10, 12, 14 and 15, in which rice bran wax, sugar cane wax, and carnauba wax were used, no phase separation occurred and it was accordingly not possible to isolate a product. This is surprising, because the acid value, saponification value, oil content, and amount of natural waxes used for comparison purposes are close to the corresponding values of the corn waxes used.

In comparison examples 11 and 13, although a phase separation was observed, in the case of rice bran wax this took 300 minutes (5 hours) despite the relatively low oil content (4.3% by weight) and the relatively high acid value of the product (35 mg KOH/g). At similar acid values to those of the rice bran wax oxidate (27 and 36 mg KOH/g), the phase separation in examples 4 and 5 occurred much more swiftly despite corn wax having a significantly higher oil content (9.7% by weight). In the case of sugar cane wax, phase separation took 10 minutes, despite the relatively high acid value of the product (47 mg KOH/g). In the case of carnauba wax, no phase separation at all was observed.

At the same time, much better iodine color values and yellowness indices were observed in the corn wax oxidates.

TABLE 4

| Example | 1 | 2 | 3 | 4 | 5 |
|---|---|---|---|---|---|
| CW 1 [g] | 200 | 200 | 200 | | |
| CW 2 [g] | | | | 200 | 200 |
| RBW 1 [g] | | | | | |
| RBW 2 [g] | | | | | |
| $CrO_3$/$H_2SO_4$ [L] | 0.6 | 2.0 | 2.0 2.0 | 0.4 | 1.0 |
| Reaction time [h] | 4 | 4 | 4 | 4 | 4 |
| Reaction temperature [° C.] | 110 | 110 | 110 | 110 | 110 |
| Time [min] to phase separation | 2 | 1 | <1 | <1 | <1 |
| Properties of the oxidized products (methods, abbreviations, and units in Table 1) | | | | | |
| AV | 11 | 20 | 45 | 27 | 36 |
| SV | 91 | 92 | 104 | 100 | 105 |
| DP | 77 | 77 | 77 | 76 | 76 |
| MP | 79 | 80 | 79 | 78 | 80 |
| EF | −210 | −229 | −225 | −210 | −216 |
| TGA | 5.56/26.4 | 7.23/24.49 | 17.58/41.25 | 9.34/27.42 | 11.87/30.69 |
| ICV | 4.6 | 0.4 | 0.4 | 1.6 | 1.1 |
| YI | 27.4 | 2.0 | 2.0 | 13.4 | 5.8 |
| NPI | 5 | 2 | 2.5 | 3.5 | 3 |

| Example | 6 | 7 | 8 | 9* | 10* | 11* |
|---|---|---|---|---|---|---|
| CW 1 [g] | | | | | | |
| CW 2 [g] | 200 | 200 | 200 | | | |
| RBW 1 [g] | | | | 200 | | |
| RBW 2 [g] | | | | | 200 | 200 |

TABLE 4-continued

| | | | | | | |
|---|---|---|---|---|---|---|
| CrO₃/H₂SO₄ [L] | 2.0 | 2.0 | 2.0 | 1.0 | 0.8 | 1.0 |
| | | 2.0 | 2.0 | | | |
| | | | 2.0 | | | |
| Reaction time [h] | 4 | 4 | 4 | 4 | 4 | 4 |
| Reaction temperature [° C.] | 110 | 110 | 110 | 110 | 110 | 110 |
| Time [min] to phase separation | <1 | <10 s | <10 s | — | — | 300 |
| Properties of the oxidized products (methods, abbreviations, and units in Table 1) | | | | | | |
| AV | 49 | 102 | 128 | — | — | 35 |
| SV | 115 | 147 | 164 | — | — | 113 |
| DP | 76 | 73 | 73 | — | — | 76 |
| MP | 78 | 75 | 75 | — | — | 80 |
| EF | −215 | −209 | −208 | — | — | −207 |
| TGA | 19.32/49.47 | 41.62/72.6 | 52.43/81.35 | — | — | 6.17/15.04 |
| ICV | 1.0 | 0.3 | 0.2 | — | — | 17.6 |
| YI | 4.3 | 1.9 | 1.6 | — | — | 86 |
| NPI | 2.5 | 2.5 | 2.5 | — | — | 3 |

| Example | 12* | 13* | 14* | 15* |
|---|---|---|---|---|
| SCW [g] | 400 | 200 | | |
| CarW [g] | | | 200 | 200 |
| CrO₃/H₂SO₄ [L] | 0.4 | 0.4 | 0.4 | 0.8 |
| Reaction time [h] | 4 | 4 | 4 | 4 |
| Reaction temperature [° C.] | 110 | 110 | 110 | 110 |
| Time [min] to phase separation | — | 10 | — | — |
| Properties of the oxidized products (methods, abbreviations, and units in Table 1) | | | | |
| AV | — | 47 | — | — |
| SV | — | 132 | — | — |
| DP | — | 78 | — | — |
| MP | — | 80 | — | — |
| EF | — | −151 | — | — |
| TGA | — | 10.85/25.88 | — | — |
| ICV | — | >120 | — | — |
| YI | — | — | — | — |
| NPI | — | — | — | — |

*Comparative example

It can be seen from this that chromosulfuric acid oxidation of corn wax (CW) is able to produce a wider range of natural wax oxidates in high quality than is usual with rice bran wax, sugar cane wax or caranuba wax.

EXAMPLES 16 TO 19

In a 1 L reaction vessel equipped with stirrer, temperature sensor, dropping funnel, and reflux condenser, the corn wax oxidates from examples 3, 5, 6, and 7 are melted under a nitrogen atmosphere and admixed with the amount of Ca(OH)₂ specified in Table 5. The reaction mixture is stirred until the desired acid value has been attained and the reaction mixture is then pressure-filtered while hot.

TABLE 5

| Example | 16 | 17 | 18 | 19 |
|---|---|---|---|---|
| Corn wax oxidate, example 3 [g] | 200 | | | |
| Corn wax oxidate, example 5 [g] | | 200 | | |
| Corn wax oxidate, example 6 [g] | | | 200 | |
| Corn wax oxidate, example 7 [g] | | | | 200 |
| Ca(OH)₂ [g] | 6.6 | 5.8 | 7.2 | 17.6 |
| Reaction time [min] | 20 | 80 | 100 | 20 |
| Reaction temperature [° C.] | 120 | 120 | 120 | 120 |

TABLE 5-continued

| Example | 16 | 17 | 18 | 19 |
|---|---|---|---|---|
| Properties of the saponified products (methods, abbreviations, and units in Table 1) | | | | |
| AV | 9 | 6 | 10 | 6 |
| SV | 92 | 80 | 71 | 45 |
| DP | 107 | 92 | — | — |
| MP | 80 | 82 | 80 | 80 |
| EF | −186 | −196 | −197 | −147 |
| TGA | 4.31/9.20 | 2.30/8.57 | 3.26/8.39 | 4.78/16.17 |
| CaC | 1.48 | 1.35 | 1.74 | 4.20 |

It can be seen from examples 16 to 19 that saponifying the corn wax oxidates with Ca(OH)₂ allows saponified products having low acid values of less than 15 mg KOH/g to be produced that are particularly suitable for uses requiring high thermal stability.

EXAMPLES 20 TO 22

In a 1 L reaction vessel equipped with stirrer, temperature sensor, dropping funnel, and reflux condenser, the corn wax oxidate from example 7 is melted under a nitrogen atmosphere and admixed with the amount of alcohol specified in Table 6 and with 0.1 g of methanesulfonic acid. The reaction mixture is stirred until the desired acid value has been attained, the water that has formed is distilled off, and the reaction mixture is then pressure-filtered while hot.

TABLE 6

| Example | 20 | 21 | 22 |
|---|---|---|---|
| Corn wax oxidate, example 7 [g] | 100 | 100 | 100 |
| Ethylene glycol [g] | 5.1 | | |
| Glycerol [g] | | 5.5 | |
| Pentaerythritol [g] | | | 7.0 |
| Reaction time [h] | 10 | 14 | 11 |
| Reaction temperature [° C.] | 120 | 127 | 132 |
| Properties of the saponified products (methods, abbreviations, and units in Table 1) | | | |
| AV | 14 | 15 | 14 |
| SV | 144 | 148 | 148 |
| DP | 73 | 74 | 73 |
| MP | 71 | 74 | 74 |
| EF | 196 | 163 | 151 |
| TGA | 7.96/26.87 | 7.30/18.46 | 5.28/11.59 |

It can be seen from examples 20 to 22 that esterifying the corn wax oxidates with ethylene glycol, glycerol or pentaerythritol allows esterified products having low acid values of less than 20 mg KOH/g to easily be produced that are particularly suitable for uses requiring high thermal stability.

The invention claimed is:

1. A corn wax oxidate (O) having an acid value measured according to ISO 2114 (2002) of from about 10 mg KOH/g to about 170 mg KOH/g and comprising genuine esters having 46 carbon atoms and genuine esters having 52 carbon atoms, wherein a ratio of the weight percent of genuine esters having 46 carbon atoms to the weight percent of genuine esters having 52 carbon atoms is greater than 1.

2. The corn wax oxidate (O) according to claim 1, comprising no more than 5% by weight, based on the total weight of the corn wax oxidate (O), of lignoceric acid.

3. The corn wax oxidate (O) according to claim 1, comprising less than 5% by weight, based on the total weight of the corn wax oxidate (O), of polyesters formed from polyhydric alcohols and aliphatic carboxylic acids having 8 to 20 carbon atoms.

4. The corn wax oxidate (O) according to claim 1, comprising
   a) from 3% to 40% by weight, based on the total weight of the corn wax oxidate (O), of free aliphatic carboxylic acids having 8 to 36 carbon atoms;
   b) from 0% to 10% by weight, based on the total weight of the corn wax oxidate (O), of free aliphatic alcohols having 24 to 36 carbon atoms;

c) from 0% to 5% by weight, based on the total weight of the corn wax oxidate (O), of free aliphatic dicarboxylic acids having 10 to 30 carbon atoms;
   d) from 30% to 97% by weight, based on the total weight of the corn wax oxidate (O), of genuine esters having 40 to 66 carbon atoms; and
   e) from 0% to 30% by weight, based on the total weight of the corn wax oxidate (O) of further natural constituents present in corn wax,
   where the sum total of a), b), c), d), and e) is 100% by weight, based on the total weight of the corn wax oxidate (O).

5. The corn wax oxidate (O) according to claim 1, obtainable by a process comprising the steps of:
   i) providing a corn wax (CW);
   ii) providing a mixture (M) of chromium trioxide and sulfuric acid;
   iii) performing the oxidation of the corn wax (CW) by reacting the corn wax (CW) with the mixture (M) to obtain a corn wax oxidate (O) reaction mixture comprising an organic phase and an aqueous phase;
   iv) ending the reaction and allowing the reaction mixture obtained in step iii) to stand until the organic phase has separated from the aqueous phase;
   v) separating off the organic phase;
   vi) optionally removing residues containing chromium compounds from the organic phase to obtain the corn wax oxidate (O) in purified form; and
   vii) optionally repeating the sequence of steps ii) to vi) using the corn wax oxidate (O), optionally in purified form, in place of the corn wax (CW).

6. The corn wax oxidate (O) according to claim 5, wherein a weight ratio of total chromium trioxide used to corn wax (CW) used is from 1:6 to 3:1.

7. The corn wax oxidate (O) according to claim 5, wherein
   the mixture (M) comprises concentrated sulfuric acid with a sulfuric acid content of at least 90% by weight; and
   the concentration of chromium trioxide in the mixture (M) is from 50 g/L to 200 g/L.

8. The corn wax oxidate (O) according to claim 5, wherein the corn wax (CW) comprises up to 25% by weight of polyesters formed from polyhydric alcohols and aliphatic carboxylic acids having 8 to 20 carbon atoms.

9. The corn wax oxidate (O) according to claim 5, wherein the reaction in step iii) is carried out while stirring at a temperature of 70° C. to 200° C. for a period of at least 30 minutes to 5 hours, at a stirrer speed of from 100 to 500 rpm, and in the absence of oxidation promoters.

* * * * *